July 18, 1944.  D. B. REPLOGLE  2,354,089
DUST ARRESTING INDICATOR FOR SUCTION CLEANERS
Filed Sept. 29, 1941
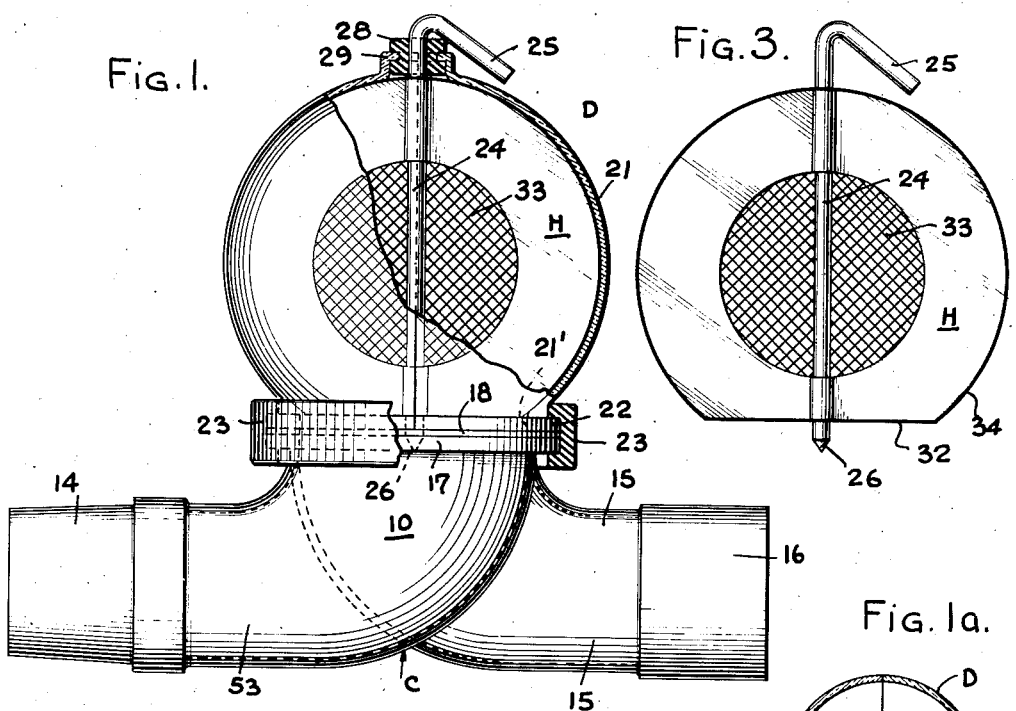
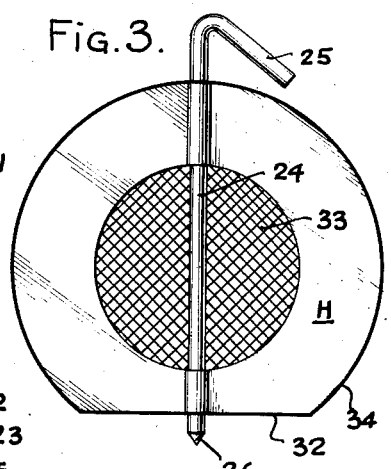
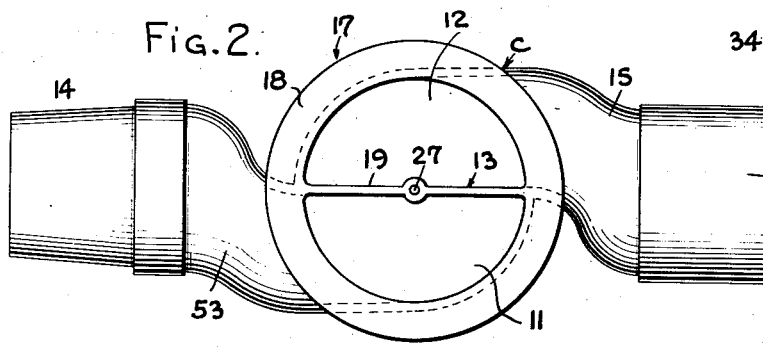
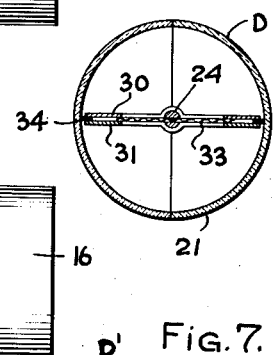
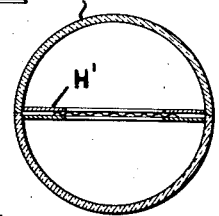
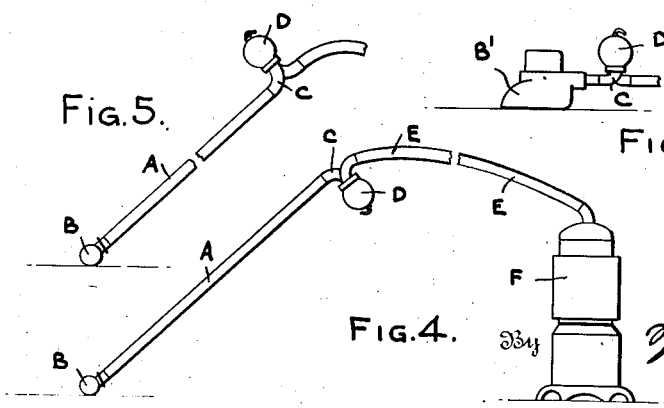
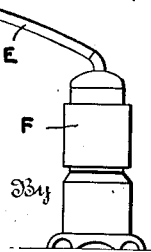
Inventor
D. B. REPLOGLE,
By Munson H. Lane,
Attorney Patented July 18, 1944

2,354,089

UNITED STATES PATENT OFFICE 2,354,089

DUST ARRESTING INDICATOR FOR SUCTION CLEANERS

Daniel Benson Replogle, Berkeley, Calif.; Bank of America National Trust and Savings Association, Carl S. Replogle, Harold E. Queen, and Laurie H. Bullock, executors of said Daniel Benson Replogle, deceased, assignors to The Ohio Citizens Trust Company, Toledo, Ohio, a corporation of Ohio, trustee Application September 29, 1941, Serial No. 412,861

22 Claims. (Cl. 302—65)

The invention relates to dust indicators for suction cleaning systems.

Broadly considered my invention comprises a dust indicator adapted to be included within a suction cleaning system, said indicator having an inlet and an outlet, and including a transparent globular walled portion or chamber having an annular diaphragm or ring closely fitting the interior of the globular portion, and arranged to deflect any dust carried by the air entering the chamber against the concave interior wall of the chamber. Means are preferably provided to permit varying the angular relation of the diaphragm or ring with reference to the inlet and outlet openings, either by rotating the globe as a whole or by rotating the diaphragm or ring only.

The invention will be more readily understood by reference to the accompanying drawing in which is set forth an illustrative embodiment of the inventive thought.

In the drawing:

Fig. 1 is a side elevation partly in section of the improved dust indicator, including a suitable casting, fitting or base having an inlet and outlet, and a superimposed transparent globe.

Fig. 1a is a section through Fig. 1.

Fig. 2 is a top plan view of the casting with the globe removed.

Fig. 3 is an elevation showing the rotatable diaphragm with which the globe is preferably equipped.

Fig. 4 is a diagrammatic view illustrating the indicator applied to a suction cleaning system.

Fig. 5 is a similar view showing the indicator in a different position.

Fig. 6 is a diagrammatic view illustrating the indicator closely coupled to a cleaning tool.

Fig. 7 is a view similar to Fig. 1a but showing a modification.

As shown the invention includes a pipe element or fitting which may be made of aluminum or of plastic with a transparent globe which would indicate the quantity and quality of dust which is obtained during sweeping.

More specifically, the said globe may have a diaphragm permanently secured therein having, say, a bright ring on one side and a red faced ring on the other and a screen in the center; and this globe though coupled with a rubber coupling band may itself ride on a swiveled metal ring which may be secured to the lips of the device so that it may freely slide around. Now, when dust and lint on the screen accumulates on one side the operator may just simply grasp this globe and turn it half way around, whereupon the accumulated lint will disappear into the dust bag. It will be apparent however, that the grit, coming in with greater tangential force than lighter materials, will circulate around, say the bright circle, on one side until the globe had been turned on its vertical axis, and then this grit will also disappear into the dust bag. The words "bright circle" and "red circle" are used simply to distinguish between the two sides, but desirably the article may be made in this manner.

According to one embodiment of the invention the dust collector includes a globe which may be molded out of plastic in two halves, having a diaphragm which may be secured between the two halves of the globe so as to complete the dust collector, thus making a construction that is rugged enough so that if one part of it is broken another part may be added. The globe may be made of a clear plastic, and the plastics cemented to the middle diaphragm.

Another procedure is to have the central diaphragm formed, say, by vulcanizing rubber on a vertical shaft so as to make it fit the interior of the globe, with a small handle, crank, or finger piece extending through a rubber bushing in a hole in the top of the globe and pivoted in a cross division in the casting below. Now, when the dust collects on, say the bright side of the diaphragm the little crank is used and the diaphragm is turned over so that the red side is toward the operator, and immediately all the accumulation will disappear. It will be apparent that during turning not a particle of the air current will be cut off. For a part of the time the current will be split and dust will accumulate on either side of the diaphragm. Furthermore, no careless operator could leave the diaphragm in such position that the suction would not be functioning.

As the element carrying the screen is turned, its outer border wipes the interior of the globe to keep it perfectly clear. The wiper may be a "Mason jar rubber" sealing ring disposed between the laminations of the screen holder, or the wiper may be a felt ring; or other suitable flexible sealing means may be employed. If for example the diaphragm element is formed by vulcanizing rubber over the soldered-together screen and its shaft, there will be provided a perfect wiper without further added parts.

Referring particularly to Fig. 4, A indicates a hollow wand or a suction pipe, to one end of which a floor tool or nozzle B is attached while the other end of the wand is detachably secured to the inlet pipe of a suitable fitting or casting C provided with a transparent indicator D. The outlet portion of this fitting is connected through a flexible tube or the like E to a combined filter and suction producing means F. The globe D may be supported in the lowered position indicated in Fig. 4 or, by simply rotating the fitting with reference to the wand A the globe may be supported in the upright position indicated in Fig. 5. In Fig. 6 the globe D is shown closely coupled to a cleaning tool or nozzle B' by means of the fitting C whose outlet may be placed in communication with any suitable source of suction. Any desired form of nozzle may be used either with or without agitators such as rotatable brushes or the like.

Referring particularly to Figs. 1 and 2, the fitting or casting C comprises a body portion 10 which is divided into two chambers 11 and 12 by means of a central partition 13. The chamber 11 is at the entrance side of the casting and is provided with an inlet pipe 53 having a male pipe end 14, adapted to be fitted to the end of the wand or suction pipe A. The chamber 12 at the exit side of the casting is similarly provided with an outlet pipe 15 having a female pipe coupling end 16. The mouth of the chamber is provided with an outwardly extending flange 17, over which may be fitted a suitable gasket 18 of rubber or the like having a connecting strip 19 covering the central partition 13.

The globe D comprises essentially a transparent spherical member 21 which may be composed of any suitable material, such as glass, Celluloid or other transparent plastic. The globe is open at the bottom and is provided with a flange 22 which is adapted to fit over the gasket 18 which in turn rests upon the flange 17 of the fitting C. The globe and fitting may be rotatably connected by means of a rubber band or other coupling member 23 which joins the flanges 17 and 22, the rubber gasket 18 insuring a fluid tight fit.

The globe may be made in one piece if desired, and used by itself to indicate the amount and character of dust entering the system, but is preferably formed in two halves which are suitably secured together over an included diaphragm or disc H shown in Figs. 1, 1a and 3.

As shown, the disc H is rotatably mounted within the globe upon a spindle 24 having a finger piece 25 at the upper end and a pivot 26 at the lower end, which pivot rests upon a bearing 27 on the top of the partition 13 as indicated in Fig. 2. A sealing bushing 28 is provided at the top of the globe which bushing may be held in place by a flange 29 formed integral with the globe. The bushing 28 may be of rubber, leather or other suitable material.

The diaphragm H may be made in a manner similar to that described in my Patent No. 2,293,920. As shown the diaphragm includes a pair of rings 30 and 31 which may be and preferably are of contrasting colors as for example gold and red, one face of which may be termed a "bright circle" and the other a "red circle" for the purpose of differentiation. These rings are provided at the bottom with straight portions 32, and include between them the spindle 24. Also included between the rings 30 and 31 is a central screen 33 and an outer sealing ring or wiper 34 extending beyond the periphery. The wiper may be of rubber, felt or other suitable sealing material.

In operation dust laden air is drawn into the system through the floor tool or nozzle B or B' and passes through the globe D where it will be visible to the operator as it circulates about the globe in contact with the wall thereof. Where a diaphragm or disc H is employed such diaphragm will initially be fitted in alignment with the partition 13. The globe is held relatively fixed by the gasket 18 and rubber coupling band 33 although subject to rotation by the operator when desired. Similarly the diaphragm will be held against undesired movement by contact of the wiper 34 with the wall of the globe. Air entering the globe will first circulate about the periphery on one side of the diaphragm finally passing through the screen to the exit side. The diaphragm may be rotated by means of the handle or finger piece 25 to present either side as desired to the dust laden air. It may also be turned to an intermediate position where this is desirable for any purpose. Furthermore a similar effect may be obtained by rotating the globe itself with reference to the fitting, instead of rotating the diaphragm with reference to the globe.

It will be obvious that large particles separated out by the screen such as jewelry or the like may be removed from the system by simply releasing the coupling 23 and lifting the globe whereupon the contents may be removed through the mouth of the globe. When this is to be done, it may be desirable to first move the globe to the position shown in Fig. 4 so that particles of dust or the like will not fall on the floor.

Many modifications and variations may be resorted to without departing from the spirit of the invention. For example, as shown in Fig. 7 the diaphragm H' may be cemented at its periphery to the globe D' and its angular relation to the inlet and outlet passages may be varied solely by rotating the globe instead of by rotating the diaphragm with reference to the globe, as shown in the previously described embodiment of the invention. In such case no shaft is required for the diaphragm and consequently no handle on the shaft and no pivot bearing are necessary; and no hole or stuffing box is required at the top of the globe.

What I claim is:

1. In a suction cleaning system, including a suction cleaning tool, a source of suction and tubular elements connecting said tool with said source of suction, a dust indicator located within the system having a body provided with inlet and outlet openings, said indicator including a transparent globular element having air and dust deflecting means therein comprising a circular diaphragm mounted therein, said diaphragm comprising an imperforate outer annular portion snugly fitting the interior of the globular element and having a central opening for passage of air therethrough, and means for rotating said diaphragm with reference to the inlet and outlet openings about a central axis.

2. A cleaning system as set forth in claim 1 wherein the globular element is rotatable with reference to the inlet and outlet openings.

3. A cleaning system as set forth in claim 1 wherein the diaphragm is rotatable with reference to the globular element.

4. A dust indicator for a suction cleaning system, said indicator having an air inlet and an air outlet adapted to be connected to adjacent tubular elements of the system, and comprising a transparent globular member providing a chamber for the circulation of dust laden air, said globular member having a rotatable imperforate deflecting ring closely engaging the concave interior thereof with an air-tight fit, and so arranged with reference to the air inlet as to deflect entering dust laden air against the concave interior of the transparent wall.

5. A dust indicator for a suction cleaning system, said indicator having an air inlet and an air outlet adapted to be connected to adjacent tubular elements of the system, and comprising a transparent globular member providing a chamber for the circulation of dust laden air, said globular member having an imperforate deflecting ring closely engaging the concave interior thereof with an air-tight fit, and so arranged with reference to the air inlet as to deflect entering dust laden air against the concave interior of the transparent wall, and means for rotating the deflecting ring element with reference to the air inlet and air outlet about a central axis of the globular member.

6. A dust indicator as set forth in claim 5 wherein the deflecting ring element is of contrasting colors on opposite sides thereof.

7. A dust indicator for a suction cleaning system comprising a body member having inlet and outlet openings, a globular element rotatably mounted upon said body member and with reference to the inlet and outlet openings thereof, and means within the globular element for deflecting entering dust laden air against the concave inner surface thereof, said deflecting means comprising a rotatable imperforate ring closely fitting the interior of the globular element with a fluid-tight fit.

8. A dust indicator for a suction cleaning system comprising a body member having inlet and outlet openings, a globular element rotatably mounted upon said body member and with reference to the inlet and outlet openings thereof, and means within the globular element for deflecting entering dust laden air against the concave inner surface thereof, said deflecting means comprising an imperforate ring closely fitting the interior of the globular element with a fluid-tight fit, and means for rotating the ring axially with reference to the globular element.

9. A dust indicator for suction cleaning systems comprising a body member provided with inlet and outlet openings, a transparent globular element mounted upon said body member in communication with said inlet and outlet openings, and means within said globular element for directing dust laden air entering through the inlet against the curved interior wall of the globular element to impart thereto a whirling movement, said means comprising a rotatable imperforate ring member fitting the globular element fluid-tight and having a central opening to permit passage of air therethrough to the outlet opening.

10. A dust indicator for a suction cleaning system, comprising a spherical chamber located in the system having an outer wall, and a circular diaphragm mounted for rotation about an axis within the chamber, said diaphragm including an outer imperforate ring portion fitting the chamber with a fluid-tight fit and adapted to deflect dust against the spherical wall of the chamber, said diaphragm having a central opening to permit air and dust to pass to an outlet.

11. In a suction cleaning system, a dust indicator comprising a tubular body member having inlet and outlet pipes, and a central partition dividing the body member into inlet and outlet chambers, a peripheral flange carried by said body member, a transparent globular element having a similar flange coacting therewith, a coupling member rotatably joining said flanges with a fluid-tight fit, and a rotatable deflecting ring within said globular element for deflecting dust laden air against the spherical wall of said globular element.

12. A dust indicator for suction cleaning systems comprising a tubular body member and a transparent globular element coacting therewith, said body member having inlet and outlet pipes adapted to be connected in said system, a cylindrical mouth portion having a central partition dividing the same into inlet and outlet chambers communicating with said pipe, said globular element having a mouth portion fitting the mouth of the body member, means for insuring a fluid-tight fit between said mouth portions, and a rotatable deflecting ring within said globular member initially lying in the plane of the said partition.

13. A dust indicator as set forth in claim 12 wherein the body member and globular element are rotatably connected.

14. A dust indicator as set forth in claim 12 wherein the rotatable deflecting ring is mounted on a spindle pivoted on said partition.

15. In a suction cleaning system, including a plurality of tubular elements, a dust indicator comprising a body member including oppositely directed inlet and outlet pipes rotatably connected between adjacent tubular elements in such a manner that the body member may be rotated about the common axis of its inlet and outlet pipes, said body member having a mouth portion divided into inlet and outlet chambers communicating with said inlet and outlet pipes; and a tubular globular element having a mouth portion communicating with the mouth of said body member, a deflecting ring in said globular member dividing the same into inlet and outlet chambers corresponding to the inlet and outlet chambers of said body member, said deflecting ring having a central recessed opening to allow passage of air and dust while restraining larger particles, the globular element being separable from said body member to permit cleaning the same, and the combined globular element and body member being rotatable about the axis of the inlet and outlet pipes to facilitate cleaning.

16. A dust indicator for a suction cleaning system, said indicator having an air inlet and an air outlet adapted to be connected to adjacent tubular elements of the system, and comprising a transparent globular member providing a chamber for the circulation of dust laden air, said globular member having an imperforate deflecting ring closely engaging the concave interior thereof with an air-tight fit, and so arranged with reference to the air inlet as to deflect entering dust laden air against the concave interior of the transparent wall.

17. In a suction cleaning system a dust indicator comprising a transparent globular element interposed between a suction nozzle and a source of suction, and having a diaphragm therein comprising an outer deflecting ring, and a central opening to allow passage of air through an exit toward the source of suction.

18. A dust indicator for suction cleaning systems, comprising a globular element having a transparent wall surface and having an inlet and an outlet pipe, said globular element including two dished members secured together with an air tight fit, and an annular deflecting ring interposed between the inlet and outlet openings of said inlet and outlet pipes, the inlet pipe being arranged to direct dust laden air against said deflecting ring, whereby a whirling movement is imparted to the air and dust laden air is directed against the transparent wall surface.

19. A dust indicator for suction cleaning systems, comprising a globular element having a transparent concave interior wall surface, a deflecting ring fitting the interior of said globular element with a fluid tight fit, an inlet pipe communicating with the interior of said globular element and adapted to direct dust laden air against said deflecting ring in an inclined direction, whereby a whirling movement is imparted to the dust laden air and the dust in said air is directed against said transparent wall surface, and an outlet pipe located at the opposite side of the deflector ring from the inlet pipe.

20. In a dust indicator for suction cleaning systems, a globular element having a transparent wall surface, and a deflector ring within said globular element mounted for relative rotation with reference to said transparent surface, said deflector ring including a flexible sealing element providing a fluid tight fit with the interior of the globular element.

21. A dust indicator for a suction cleaning system, comprising a globular element having a concave transparent interior wall portion, and having an inlet for dust laden air and an air outlet, and deflecting means located between the inlet and outlet for directing entering dust laden air against the concave interior of the globular wall and for producing a whirling movement of the air and dust prior to passage to the outlet, said deflecting means comprising an imperforate ring nonrotatably fixed within the globular element and so inclined with reference to the air inlet that the entering air impinges angularly upon the ring and the dust contained therein is directed against the curved interior wall, said ring having a central opening to allow passage of air to the outlet opening.

22. In a suction cleaning system a dust indicator comprising a transparent globular element interposed between a suction nozzle and a source of suction, and having a fixed diaphragm therein comprising an outer deflecting ring, and a central opening to allow passage of air through an exit toward the source of suction.

DANIEL BENSON REPLOGLE.